US011579826B2

(12) United States Patent
Ban et al.

(10) Patent No.: US 11,579,826 B2
(45) Date of Patent: Feb. 14, 2023

(54) NON-TRANSITORY COMPUTER-READABLE RECORDING MEDIUM, CONTROL SYSTEM, AND METHOD OF CONTROLLING INFORMATION PROCESSING APPARATUS

(71) Applicant: BROTHER KOGYO KABUSHIKI KAISHA, Nagoya (JP)

(72) Inventors: Ryoji Ban, Nagoya (JP); Ryo Yasui, Nagoya (JP); Satoki Nagao, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/123,898

(22) Filed: Dec. 16, 2020

(65) Prior Publication Data

US 2021/0191676 A1 Jun. 24, 2021

(30) Foreign Application Priority Data

Dec. 18, 2019 (JP) .............................. JP2019-228108

(51) Int. Cl.
*G06F 40/42* (2020.01)
*G06F 3/12* (2006.01)
(Continued)

(52) U.S. Cl.
CPC .......... *G06F 3/1253* (2013.01); *G06F 3/0482* (2013.01); *G06F 3/04845* (2013.01); *G06F 40/166* (2020.01); *G06F 40/42* (2020.01)

(58) Field of Classification Search
CPC ........ G06F 40/58; G06F 40/51; G06F 40/263; G06F 40/30; G06F 3/1253; G06F 3/1271;
(Continued)

(56) References Cited

U.S. PATENT DOCUMENTS

| 8,996,356 | B1* | 3/2015 | Yang ................... G06F 3/04886 704/4 |
| 2001/0029455 | A1* | 10/2001 | Chin ....................... G06F 40/58 704/277 |
| 2003/0229543 | A1* | 12/2003 | Zimmerman ...... G06Q 30/0601 705/26.1 |

(Continued)

FOREIGN PATENT DOCUMENTS

JP 2010-240844 A 10/2010
JP 2011-073336 A 4/2011
(Continued)

*Primary Examiner* — Wilson W Tsui
(74) *Attorney, Agent, or Firm* — Scully, Scott, Murphy & Presser, PC

(57) ABSTRACT

A non-transitory computer-readable recording medium stores instructions executable by a controller of an information processing apparatus. The instructions cause the controller to perform operations. The operations include: displaying an edit screen, the edit screen being configured to receive a translation instruction, the edit screen including a text area and a print area, the print area being configured to place therein a target text string to be printed; upon receiving on the edit screen an operation for inputting the target text string, displaying the target text string in a first language in the text area; upon receiving on the edit screen the translation instruction for translating the target text string displayed in the text area from the first language into a second language, translating the target text string to obtain a translation data piece representing a translated text string in the second language.

13 Claims, 12 Drawing Sheets

(51) Int. Cl.
*G06F 3/04845* (2022.01)
*G06F 40/166* (2020.01)
*G06F 3/0482* (2013.01)

(58) Field of Classification Search
CPC ...... G06F 40/166; G06F 40/42; G06F 3/0482;
G06F 3/04845
See application file for complete search history.

(56) References Cited

U.S. PATENT DOCUMENTS

| | | | |
|---|---|---|---|
| 2010/0204977 A1* | 8/2010 | Chiu | G06F 40/58 704/2 |
| 2010/0250233 A1* | 9/2010 | Tanaka | G06F 3/1208 704/3 |
| 2011/0238645 A1* | 9/2011 | Zhang | G06F 16/3322 707/706 |
| 2013/0066983 A1* | 3/2013 | Li | H04L 67/145 709/206 |
| 2013/0258403 A1 | 10/2013 | Kawai | |
| 2015/0106702 A1* | 4/2015 | Scott | G06F 3/0237 715/265 |
| 2017/0140563 A1* | 5/2017 | No | H04N 1/00198 |
| 2018/0024848 A1* | 1/2018 | Dmytryshyn | G06F 9/454 704/2 |
| 2019/0034080 A1* | 1/2019 | Nagel | G06F 3/04886 |

FOREIGN PATENT DOCUMENTS

| | | | |
|---|---|---|---|
| JP | 2013-210780 A | 10/2013 | |
| JP | 2018-089826 A | 6/2018 | |
| WO | WO-2007118476 A2 * | 10/2007 | ............ G06F 17/211 |

\* cited by examiner

FIG. 8

| SECOND LANGUAGES | TIME OF LATEST SELECTION (Hd) | THE NUMBER OF SELECTIONS |
|---|---|---|
| ENGLISH | 2019/11/20 11:05:01 | 10001··· |
| FRENCH | 2019/11/20 11:05:05 | 10001··· |
| GERMAN | 2019/11/19 15:00:00 | 6001··· |
| ICELANDIC | ··· | ··· |
| CHINESE | ··· | ··· |
| FINNISH | ··· | ··· |

NON-TRANSITORY COMPUTER-READABLE RECORDING MEDIUM, CONTROL SYSTEM, AND METHOD OF CONTROLLING INFORMATION PROCESSING APPARATUS

CROSS-REFERENCE TO RELATED APPLICATION

This application claims priority from Japanese Patent Application No. 2019-228108 filed on Dec. 18, 2019, the content of which is incorporated herein by reference in its entirety.

TECHNICAL FIELD

Aspects of the disclosure relate to technology for translating a text string from a first language into a second language.

BACKGROUND

A known printer translates a text string prepared in a first language, for example, Japanese, into a second language different from the first language. The printer prints a translated text string on a print medium such as a label.

SUMMARY

The printer may display a first screen and a second screen. The first screen may be for inputting a text string to be printed. The second screen may be for inputting a text string to be translated. In such a case, a user is to input and copy a text string on the first screen, change screens from the first screen to the second screen, and paste the copied text string on the second screen. This may be tedious and time-consuming for the user.

Aspects of the disclosure provide a non-transitory computer-readable recording medium, a control system, and a control method for controlling an information processing apparatus to translate a target text string while saving a user extra work.

According to one or more aspects of the disclosure, a non-transitory computer-readable recording medium stores instructions executable by a controller of an information processing apparatus. The instructions cause the information processing apparatus to perform operations. The operations include: displaying an edit screen, the edit screen being configured to receive a translation instruction, the edit screen including a text area and a print area, the print area being configured to place therein a target text string to be printed; upon receiving on the edit screen an operation for inputting the target text string, displaying the target text string in a first language in the text area; upon receiving on the edit screen the translation instruction for translating the target text string displayed in the text area from the first language into a second language, translating the target text string to obtain a translation data piece representing a translated text string in the second language; and displaying in the print area the translated text string in the second language, based on the translation data piece.

An information processing apparatus storing the above-described non-transitory computer-readable recording medium, as well as a control system, including an information processing apparatus and another apparatus (e.g., a server), to achieve translation of a text string are new and useful. Also, a method of controlling an information processing apparatus to achieve translation of a text string is new and useful.

BRIEF DESCRIPTION OF THE DRAWINGS

Aspects of the disclosure are illustrated by way of example and not by limitation in the accompanying figures in which like reference characters indicate similar elements.

FIG. 8 is a diagram illustrating history information.

DETAILED DESCRIPTION

First Illustrative Embodiment

Figure 1:
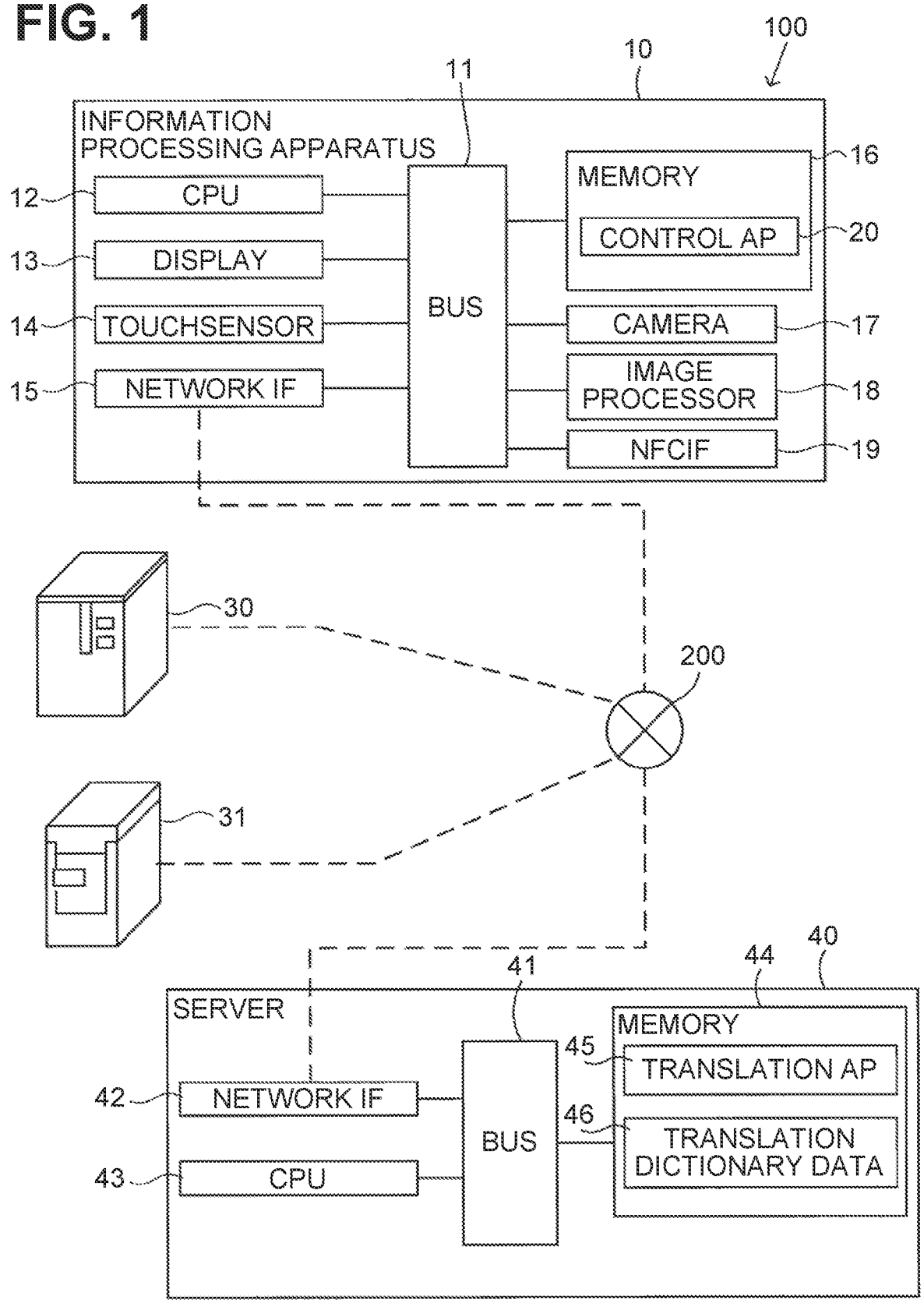
FIG. 1 is a configuration diagram of a printing system.

A printing system 100 according to a first illustrative embodiment will be described with reference to the drawings. The printing system 100 shown in FIG. 1 includes an information processing apparatus 10, printers 30 and 31, and a server 40.

The information processing apparatus 10, the printers 30 and 31, and the server 40 are connected to a network 200. Specifically, the information processing apparatus 10 and the printers 30 and 31 are wirelessly connected through a router that is a component of the network 200. In this illustrative embodiment, the network 200 may be the Internet, a local area network (LAN), or a combination of the Internet and the LAN. The network 200 may be a wired network, a wireless network, or a combination of a wired network and a wireless network.

The printers 30 and 31 are configured to print a print image on a print medium. The print image includes objects, such as text, an icon, and a code. The code may include a one-dimensional code such as a barcode, and a two-dimensional code such as a QR Code that is a registered trademark of Denso Wave Incorporated. In this embodiment, the printers 30 and 31 each eject ink to print a print image on an elongate tape. Alternatively, thermal printers may be used, which thermally print objects on a heat-sensitive tape.

The information processing apparatus 10 may be a terminal device such as a smartphone or a tablet. The information processing apparatus 10 includes a data bus 11, a central processing unit (CPU) 12, a display 13, a touch sensor 14, a network interface (IF) 15, a memory 16, a camera 17, an image processor 18, and a Near Field Communication Interface (NFCIF) 19. These elements are communicable with each other via the data bus 11.

The display 13 includes a screen surface on which an image is displayed. The display 13 includes a touch sensor 14 disposed over the screen surface of the display 13. The touch sensor 14 is configured to detect a user's finger or a stylus approaching and contacting the touch sensor 14 and, upon detection, outputs an electrical signal. Hereinafter, an operation on the touch sensor 14 by a user is also referred to as a user's operation. In this embodiment, the display 13 with the touch sensor 14 is an example of an operation unit. The information processing apparatus 10 may include, as an operation unit, physical keys.

The network IF 15 is an interface for executing wireless communication in conformity with Wi-Fi standard based on the IEEE 802.11 standard or equivalent thereof. Wi-Fi is a registered trademark of Wi-Fi Alliance. The NFC IF 19 is an interface for executing wireless communication in conformity with Near Field Communication (NFC) standard. The information processing apparatus 10 is wirelessly communicable with the printers 30 and 31 via the network IF 15 and the NFC IF 19. The network IF 15 may be in conformity with communication scheme for short-range wireless communication via, for example, Bluetooth for communicating with the printers 30 and 31. Bluetooth is a registered trademark of BLUETOOTH SIG, INC. In this embodiment, the network IF 15 and the NFC IF 19 each are an example of a communication unit.

The camera 17 includes a lens and an image sensor, and is configured to capture an image to generate captured image data. The image processor 18 includes a dedicated circuit including, for example, an integrated circuit (IC), and performs image processing on the captured image data. Specifically, the image processor 18 converts the captured image data into a format displayable on the display 13, and recognizes text included in the captured image and generates text data. The image processor 18 may be realized by the CPU 12 in accordance with a program stored in the memory 16, or by a combination of a dedicated circuit and the CPU 12 processing in accordance with the program. In this embodiment, the touch sensor 14 and the camera 17 each are an example of a user interface.

The memory 16 may include a random access memory (RAM), a read-only memory (ROM), a flash memory, or a combination thereof. The memory 16 may be a computer-readable recording medium. The computer-readable recording medium may also be a CD-ROM and a DVD-ROM.

The memory 16 stores therein a client operating system (OS) and a control application (hereinafter referred to as a control AP) 20. Under execution of the client OS, the CPU 12 is configured to execute the control AP 20 to control a printing process by the printers 30 and 31. The memory 16 stores, in its data storage area, various data to be referred to by the CPU 12 executing the control AP 20. In this embodiment, the control AP 20 is an example of a control program. In some cases, the CPU 12 executing the control AP 20 may be simply referred to by a program name. For example, in some cases, "the control AP 20" may indicate "the CPU 12 executing the control AP 20".

In this embodiment, processes by the CPU 12 in accordance with instructions written in a program will be mainly described. In the following description, processes, such as to "determine", "select", "obtain", "receive", and "control" indicate processes by the CPU 12. Processes by the CPU 12 include hardware control via the client OS. The term "obtain" is used under the notion that "obtain" does not necessarily require a request. Namely, the notion that "the CPU 12 obtains data" includes a process by the CPU 12 to receive data without making a request. "Data" in this specification may be represented by computer-readable bit strings. In this specification, just a difference in data format may not mean a difference of data. This also applies to "information" in this specification.

The server 40 is configured to exchange various data with the information processing apparatus 10 via the network 200. The server 40 includes a data bus 41, a network interface (IF) 42, a CPU 43, and a memory 44.

The memory 44 stores therein a server operating system (OS) not shown and a translation application (hereinafter referred to as a translation AP) 45 which is a program executable by the CPU 43. The translation AP 45 is a program to perform translation function for translating a text string from a first language into a second language which is different from the first language. The memory 44 stores therein translation dictionary data 46 to be referred to by the translation AP 45. The translation dictionary data 46 is referred to by the translation AP 45 and stores the correspondence between the text string in the first language and a translation result in the second language. Under execution of the server OS, the CPU 43 executes the translation AP 45 to translate the text string in the first language into a text string in the second language which is a translation target language.

Figure 2:
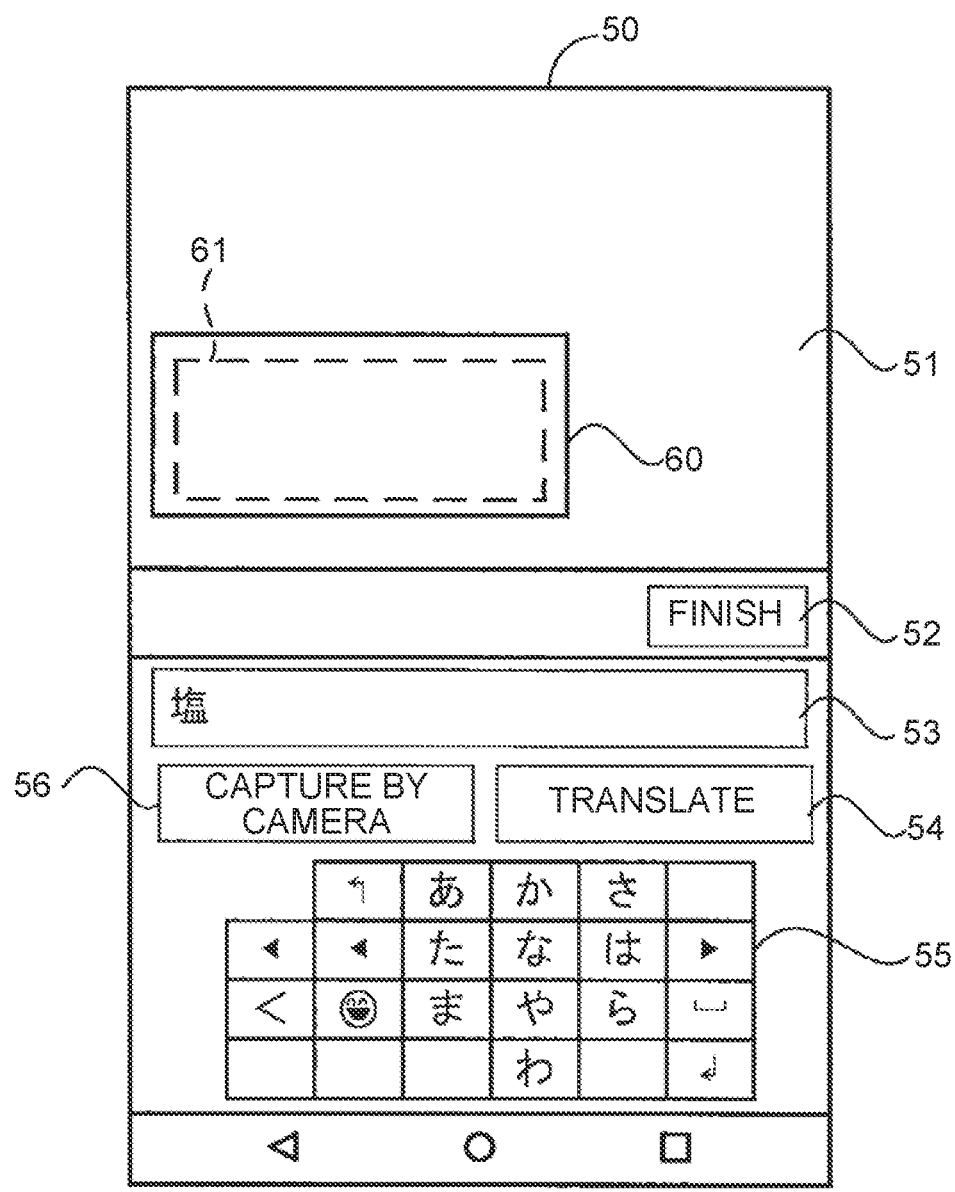
FIG. 2 is a diagram showing an edit screen displayed on a display of an information processing apparatus of the printing system.

Referring to FIG. 2, a screen that the display 13 is caused by the control AP 20 to display will be described. When a print function is selected, the control AP 20 causes the display 13 to display an edit screen 50 for forming a print image as shown in FIG. 2. The edit screen 50 includes an image display area 51, a finish button 52, a text area 53, a translate button 54, a keyboard image 55, and a camera input button 56.

The image display area 51 receives edits to a print image to be printed by a printing process by the printers 30 and 31. Specifically, a print area 61, where the control AP 20 causes to display an print image, is defined on a background image 60 included in the image display area 51. The background image 60 and the print area 61 are rectangular in shape and has a predetermined size according to the size of a sheet on which the printers 30 and 31 print. An area outside the print area 61 on the background image 60 is defined as a marginal area. The printers 30 and 31 do not print a portion of a print image extending into the marginal area.

In the text area 53, a text string, which constitutes objects of a print image, is displayed. The keyboard image 55 includes a plurality of key images to be touched by a user, and allows for the user to input a text string in the text area 53 and to edit the input text string through a user's operation of the key images on the display 13. In the following description, a text string displayed in the text area 53 is also referred to as a target text string.

The translate button 54 is to receive an instruction for translating a target text string displayed in the text area 53.

The camera input button 56 is to receive an instruction for inputting in the text area 53 a text string extracted from captured image. When the camera input button 56 is operated, the control AP 20 causes the image processor 18 to extract a text string included in the captured image. The control AP 20 causes to display in the text area 53 the text string extracted from the captured image.

The control AP 20 is configured to change the settings for a target text string displayed in the text area 53 in response to a user's operation. Specifically, the control AP 20 is configured to change font size, font name, and font color of the target text string. The finish button 52 is to receive an instruction for displaying in the print area 61 the target text string that is displayed in the text area 53.

In this embodiment, the control AP 20 enables a user, on the edit screen 50, to input a target text string in the text area 53 and to make a request for the sever 40 to translate the target text string into a second language to display a translation result in the print area 61.

Figure 3:
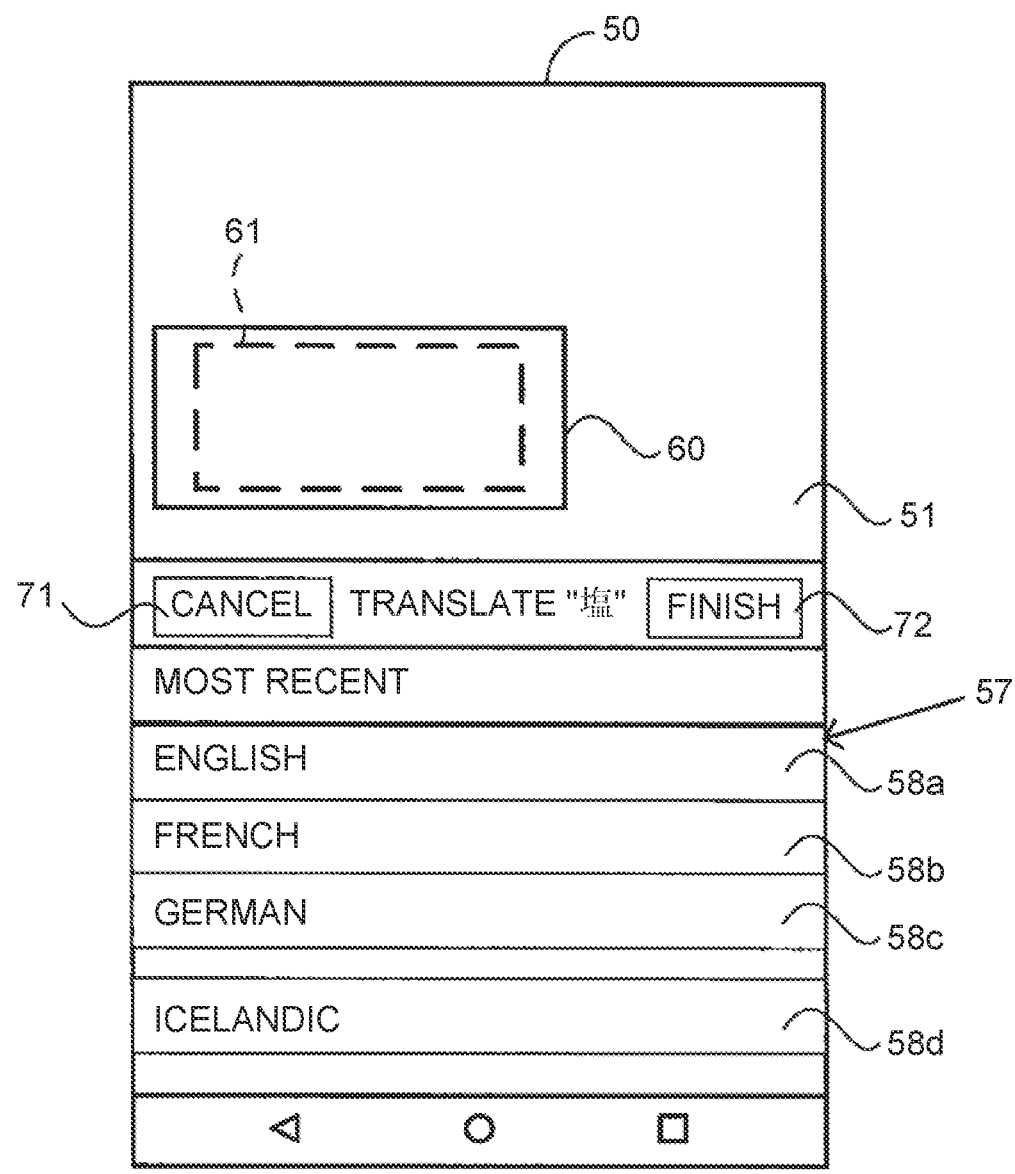
FIG. 3 is a diagram illustrating the edit screen.

Referring to FIG. 2, translation of a target text string on the edit screen 50 will be described. As shown in FIG. 3, upon operation of the translate button 54 by a user, the control AP 20 causes to display a translation function column 57, a cancel button 71, and a finish button 72, on the edit screen 50 below the image display area 51. The translation function column 57 includes a plurality of language buttons 58 which receive selections of second languages into which the target text string is translated.

In this embodiment, since Japanese is set by the control AP 20 as a first language, second languages are to be other than Japanese. The first language may be changed by changing the language settings included in the translation function column 57.

In FIG. 3, as the translation language buttons 58, an English button 58a, a French button 58b, a German button 58c, and an Icelandic button 58d are displayed while being arranged in a height direction. The English button 58a is to receive from the user an instruction for selecting English as a second language into which the target text string is translated. The French button 58b is to receive from the user an instruction for selecting French as a second language into which the target text string is translated. The German button 58c is to receive from the user an instruction for selecting German as a second language into which the target text string is translated. The Icelandic button 58d receives from the user an instruction for selecting Icelandic as a second language into which the target text string is translated. In this embodiment, additional translation language buttons for further languages may be displayed by scrolling down the translation function column 57. As will be described in detail later, in this embodiment, the translation language buttons 58 recently selected by the user are displayed at upper positions. In FIG. 3, the English button 58a, the French button 58b, the German button 58c are displayed at upper positions, as the translation language buttons 58 recently selected.

Upon operation by the user of a translation language button 58 and then the finish button 72, the control AP 20 transmits to the server 40 a translation request for translating the target text string into the second language corresponding to the operated translation language button 58. In response to receiving a translation result from the server 40, the control AP 20 causes to display in the text area 53 the translation result. When the user operates the cancel button 71, the control AP 20 returns to the edit screen 50 shown in FIG. 2.

Figure 4:
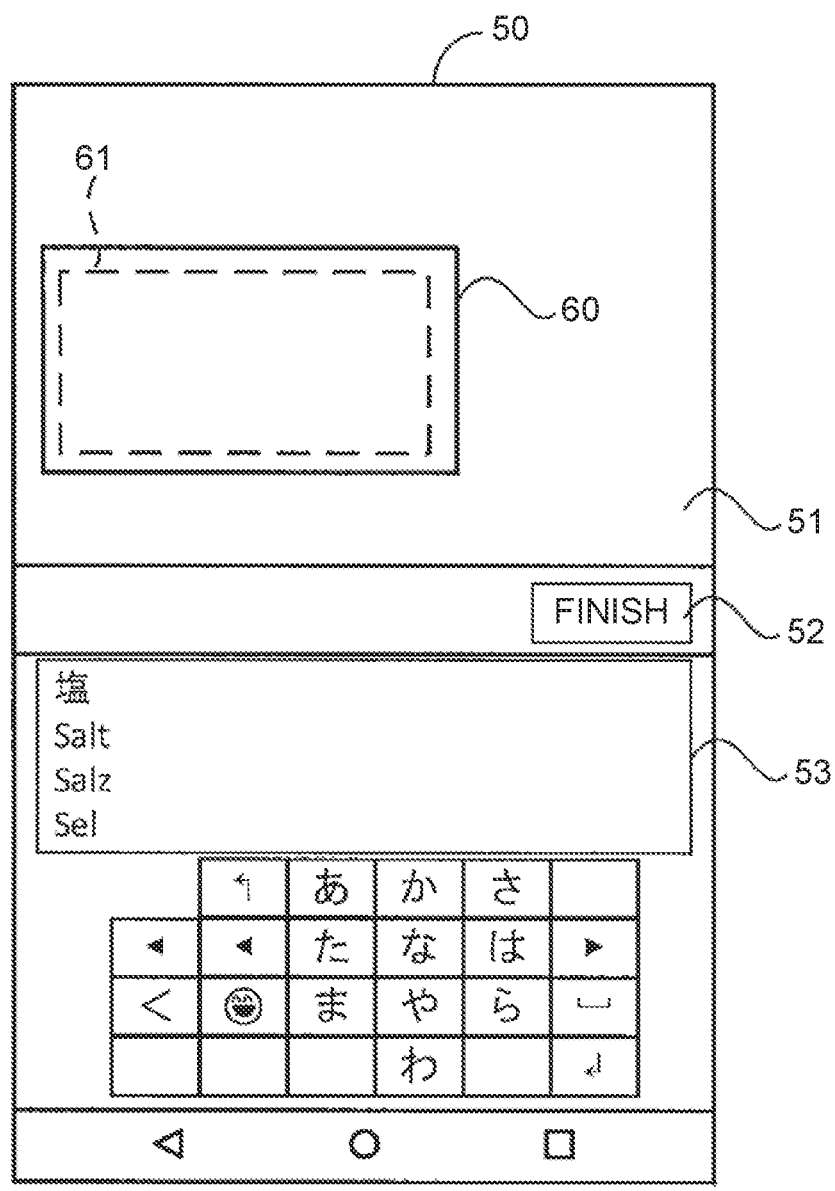
FIG. 4 is a diagram illustrating the edit screen.

In this embodiment, a plurality of second languages are selectable for translation of a single target text string. FIG. 4 shows translated text strings displayed in the text area 53 when the English button 58a, the German button 58c, and the French button 58b have been sequentially operated. In the text area 53, the target text string in Japanese as the first language which is written in kanji (Chinese characters), the translated text string "Salt" in English, the translated text string "Salz" in German, and the translated text string "Sel" in French are displayed while being arranged in the height direction. As will be described in detail later, in this embodiment, the translated text strings are displayed in accordance with the order of selections of the translation language buttons 58 by the user.

Figure 5:
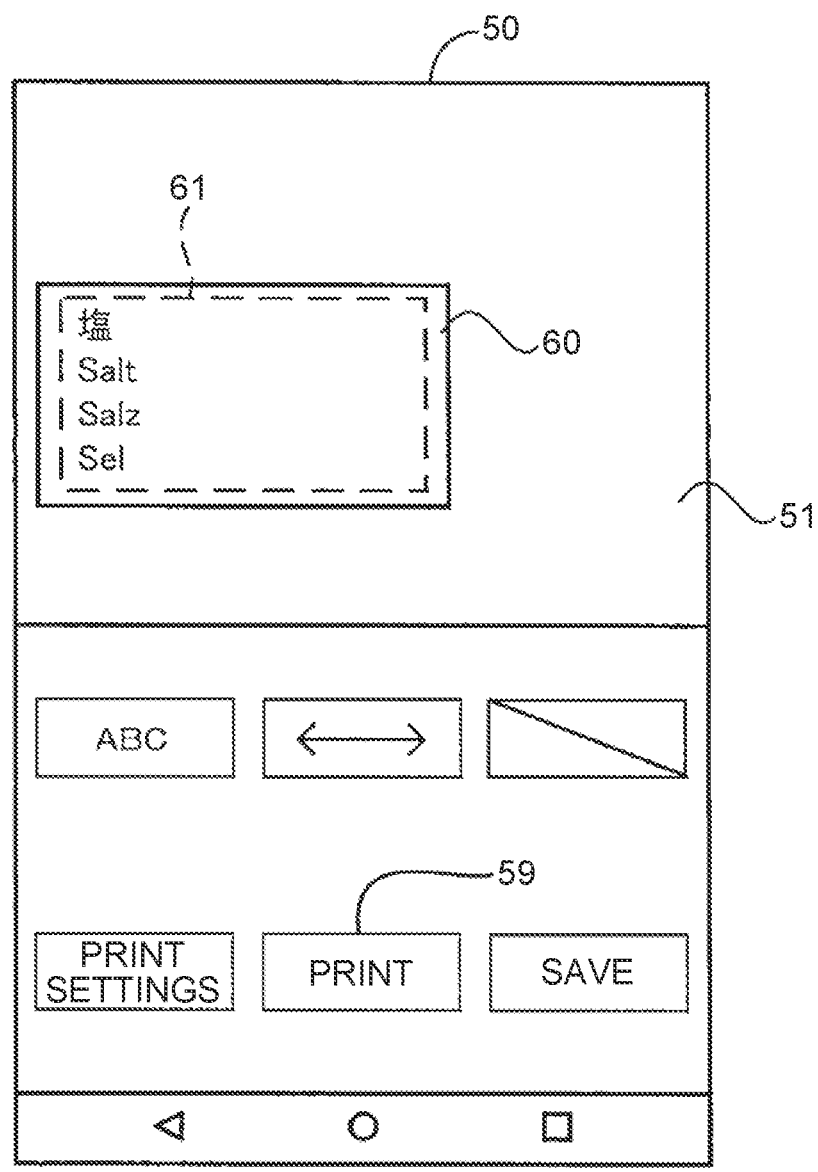
FIG. 5 is a diagram illustrating the edit screen.

Upon operation of the finish button 52 by the user in a state where the translated text strings in the respective languages are displayed in the text area 53, as shown in FIG. 5, the control AP 20 causes to display in the print area 61 the translation results displayed in the text area 53. In this embodiment, the target text string in Japanese as the first language and the translated text strings in the second languages are displayed while being arranged in the height direction. In short, a print image, including the target text string and the translation results in the respective languages selected by the user, are displayed in the print area 61.

When the user operates a print button 59 on the edit screen 50, the control AP 20 transmits a print instruction for causing either one of the printers 30 and 31 to print the print image. Specifically, the control AP 20 generates a print job corresponding to the print image, and transmits the generated print job to a designated printer which is either one of the printers 30 and 31. In response to the user's operation on a setting screen (not shown), the control AP 20 may perform a setting process to change the settings for a printing process, such as, the sheet size and the designated printer. Upon operation of the finish button 52 by the user in a state where the target text string in Japanese is only displayed in the text area 53, the control AP 20 causes to display in the print area 61 the target text string in Japanese.

Figure 6:
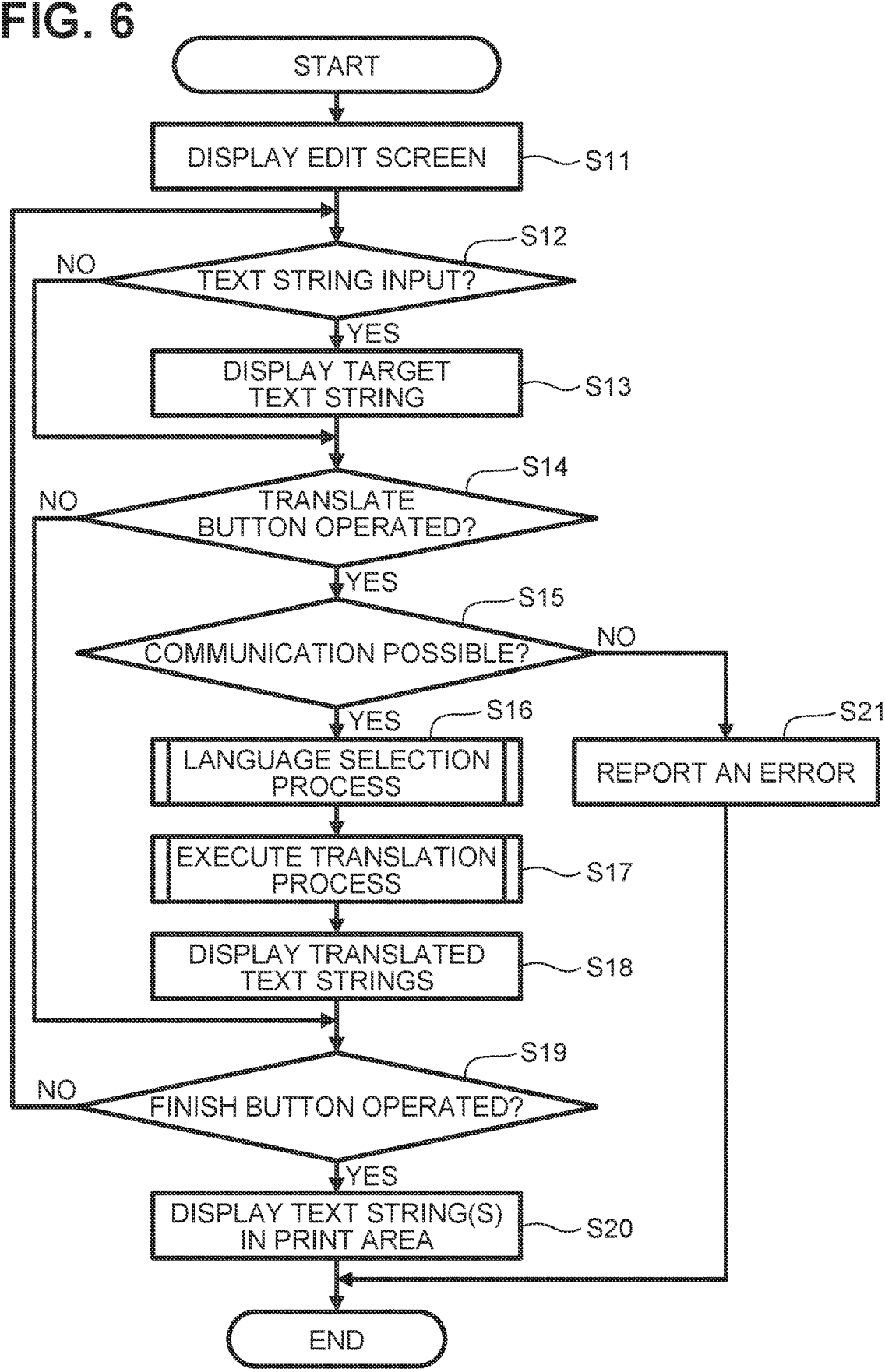
FIG. 6 is a flowchart illustrating steps of translating a text string.

Referring to FIG. 6, steps of translating a target text string into second languages will be described. A process shown in FIG. 6 starts when a print function is selected on the display 13.

In step S11, the CPU 12 causes the display 13 to display the edit screen 50. In step S12, the CPU 12 determines whether a text string has been input in the text area 53 in a state where the edit screen 50 is displayed. The CPU 12 determines that a text string has been input in the text area 53 upon detecting a user's operation of the keyboard image 55. Upon determining that no text string has been input in the text area 53, the CPU 12 proceeds to step S14. Upon determining that a text string has been input in the text area 53, the CPU 12 proceeds to step S13.

In step S13, the CPU 12 causes to display the target text string in the text area 53. In this embodiment, since Japanese is set as a first language, the target text string is displayed in Japanese.

In step S14, the CPU 12 determines whether the translate button 54 has been operated. Upon determining that the translate button 54 has not been operated, the CPU 12 proceeds to step S19. In step S19, the CPU 12 determines whether the finish button 52 has been operated. Upon determining that the finish button 52 has been operated, in step S20, the CPU 12 causes to display in the print area 61 the target text string displayed in the text area 53. The target text string in Japanese as the first language is displayed, as it is, in the print area 61.

On the other hand, upon determining in step S14 that the translate button 54 has been operated, the CPU 12 proceeds to step S15. In step S15, the CPU 12 determines whether communication with the server 40 is available. The CPU 12 determines that communication with the server 40 is available, for example, when the information processing apparatus 10 is connected to the network 200. On the other hand, the CPU 12 determines that communication with the server 40 is unavailable when the information processing apparatus 10 is not connected to the network 200. Alternatively, the CPU 12 may determine that communication with the server 40 is unavailable even when the information processing apparatus 10 is connected to the network 200.

Upon determining in step S15 that communication with the server 40 is unavailable, the CPU 12 proceeds to step S21 and notifies an error indicating that a translation process is inexecutable. In this embodiment, the CPU 12 causes the display 13 to display a warning image indicating that a translation process is inexecutable.

Figure 7:
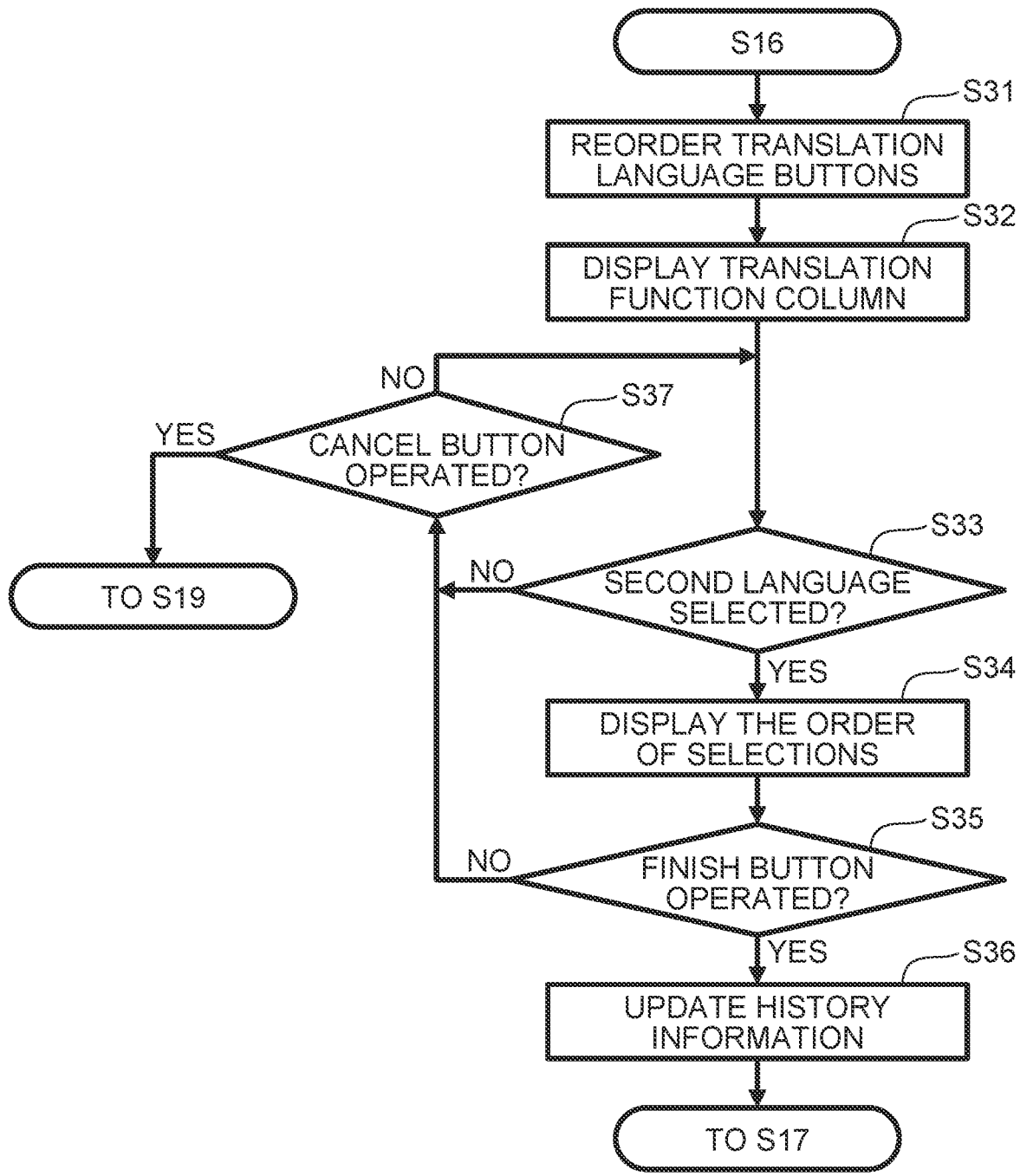
FIG. 7 is a flowchart illustrating substeps of a process executed in step S16 in FIG. 6.

Upon determining in step S15 that communication with the server 40 is available, the CPU 12 proceeds to step S16. In step S16, the CPU 12 performs a language selection process for receiving selections of second languages into which the target text string is translated. FIG. 7 is a flowchart illustrating detailed substeps of step S16.

In step S31, the CPU 12 determines, using history information Hd, the display order of the translation language buttons 58 displayed in the translation function column 57 in FIG. 3. The history information Hd includes various information regarding second languages selectable by the control AP 20 as target translation languages as shown in FIG. 8. The various information may include information of the time of latest selection and information of the number of selections, in association with each second language. The information of the time of latest selection indicates the most recent date and time when each second language was selected. The information of the number of selections indicates how many times each second language was selected during a predetermined period. For example, when the information of the time of latest selection for each of "French", "English", and "German" are stored in the history information Hd in this order from the present to the past as shown in FIG. 8, the display order of the translation language buttons 58 at the upper three positions displayed at FIG. 3 is changed where the French button 58*b*, the English button 58*a*, and the German button 58*c* are arranged in this order from the top.

In step S32, the CPU 12 causes to display the translation language buttons 58 determined in step S31 in the translation function column 57 on the edit screen 50.

In step S33, the CPU 12 determines whether at least one second language has been selected as a target translation language. Specifically, the CPU 12 determines that at least one second language has been selected when any of the translation selection buttons 58 in the translation function column 57 has been operated by the user. Upon determining in step S33 that no second language has been selected as a target translation language, the CPU 12 proceeds to step S37. On the other hand, upon determining in step S33 that at least one second language has been selected as a target translation language, the CPU 12 proceeds to step S34.

Figure 9:
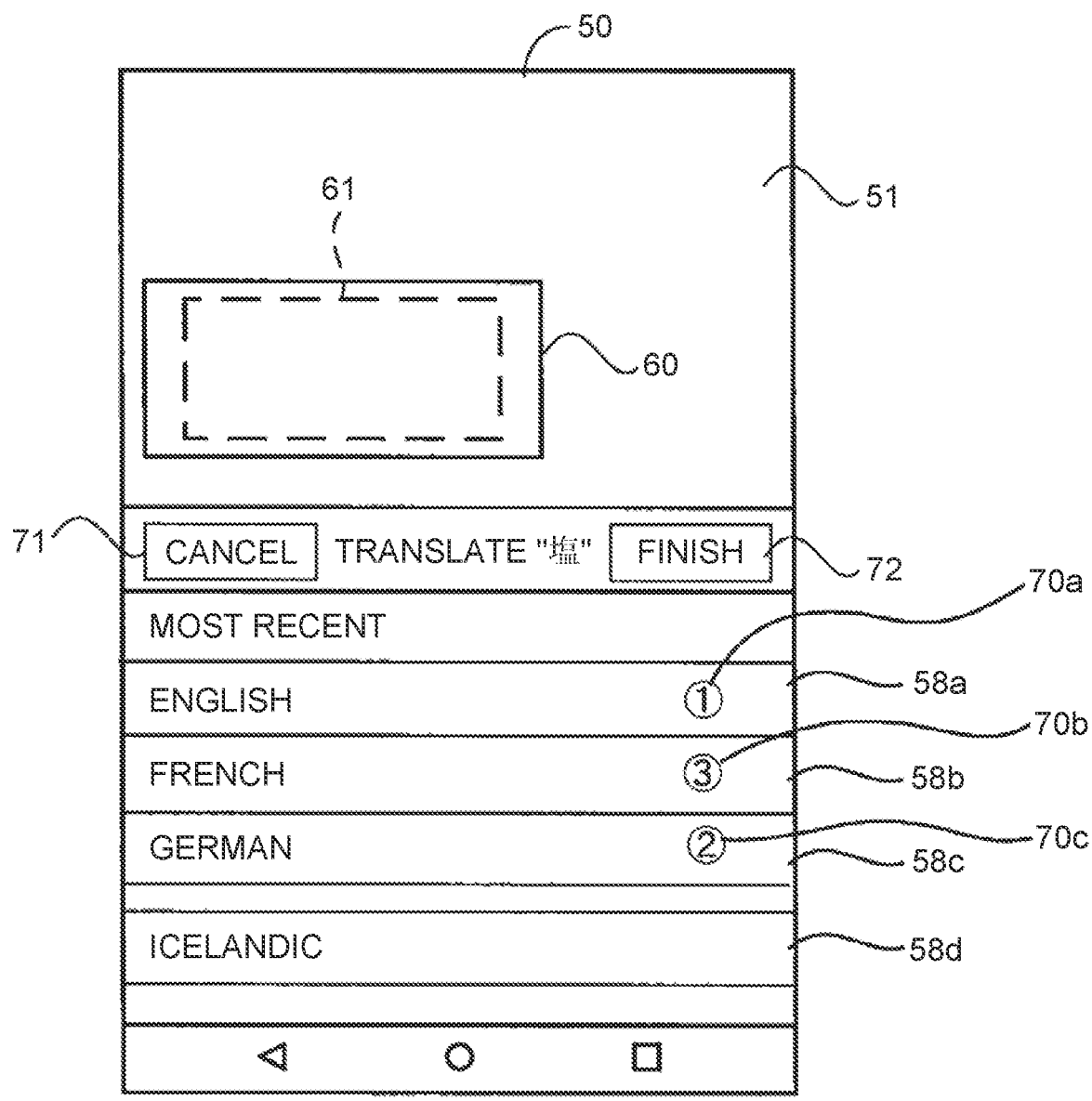
FIG. 9 is a diagram illustrating the edit screen.

In step S34, the CPU 12 causes to display in the translation function column 57 a symbol of the order of selections by the user of second languages as target translation languages. Specifically, the CPU 12 stores the order of selections (order of operations) of the translation language buttons 58 by the user for a single target text string, and causes to display symbols for the selected translation language buttons 58 to indicate the order of selections of second languages. In an example shown in FIG. 9, the English button 58*a*, the German button 58*c*, and the French button 58*b* have been operated in this order by the user. Accordingly, symbols 70*a*, 70*b*, and 70*c* indicating the order of selections of second languages are displayed at the ends of the respective operated translation language buttons 58. The symbols 70*a*, 70*b*, and 70*c* allows the user to readily confirm the selected second languages and an order of selections of second languages as a target translation language. As shown in FIG. 4, translated text strings are arranged in the order as indicated by the symbols 70*a*, 70*b*, and 70*c*. Thus, the user, if remembering the symbols 70*a*, 70*b*, and 70*c*, may recognize languages of the translated text strings in accordance with positions of the translated text strings displayed. Alternatively, the CPU 12 may determine the order of selections of translation language buttons 58 using information of the time of latest selection in the history information Hd. Alternatively, the CPU 12 may display names of the second languages adjacent to corresponding translation results in the edit screen 50 to enhance user's convenience.

Referring back to FIG. 7, in step S35, the CPU 12 determines whether the finish button 72 has been operated. Upon determining that the finish button 72 has not been operated, the CPU 12 proceeds to step S37. Upon determining that the finish button 72 has been operated, the CPU 12 proceeds to step S36.

In step S36, the CPU 12 updates the history information Hd. Specifically, in a case where any of the translation language buttons 58 has been operated by the user, the information of the time of latest selection in the history information Hd is updated to the current time, and the information of the number of selections in the history information Hd is updated by adding one, in association with the corresponding second language. After step S36, the CPU 12 proceeds to step S17 in FIG. 6.

In step S37, the CPU 12 determines whether the cancel button 71 has been operated. In a case where the cancel button 71 as well as translation language buttons 58 have been operated by the user, the CPU 12 deletes the order of operations of the translation language buttons 58 stored in the memory 16, and proceeds to step S19. Upon determining that the cancel button has not been operated, the CPU 12 proceeds to step S33.

Figure 10:
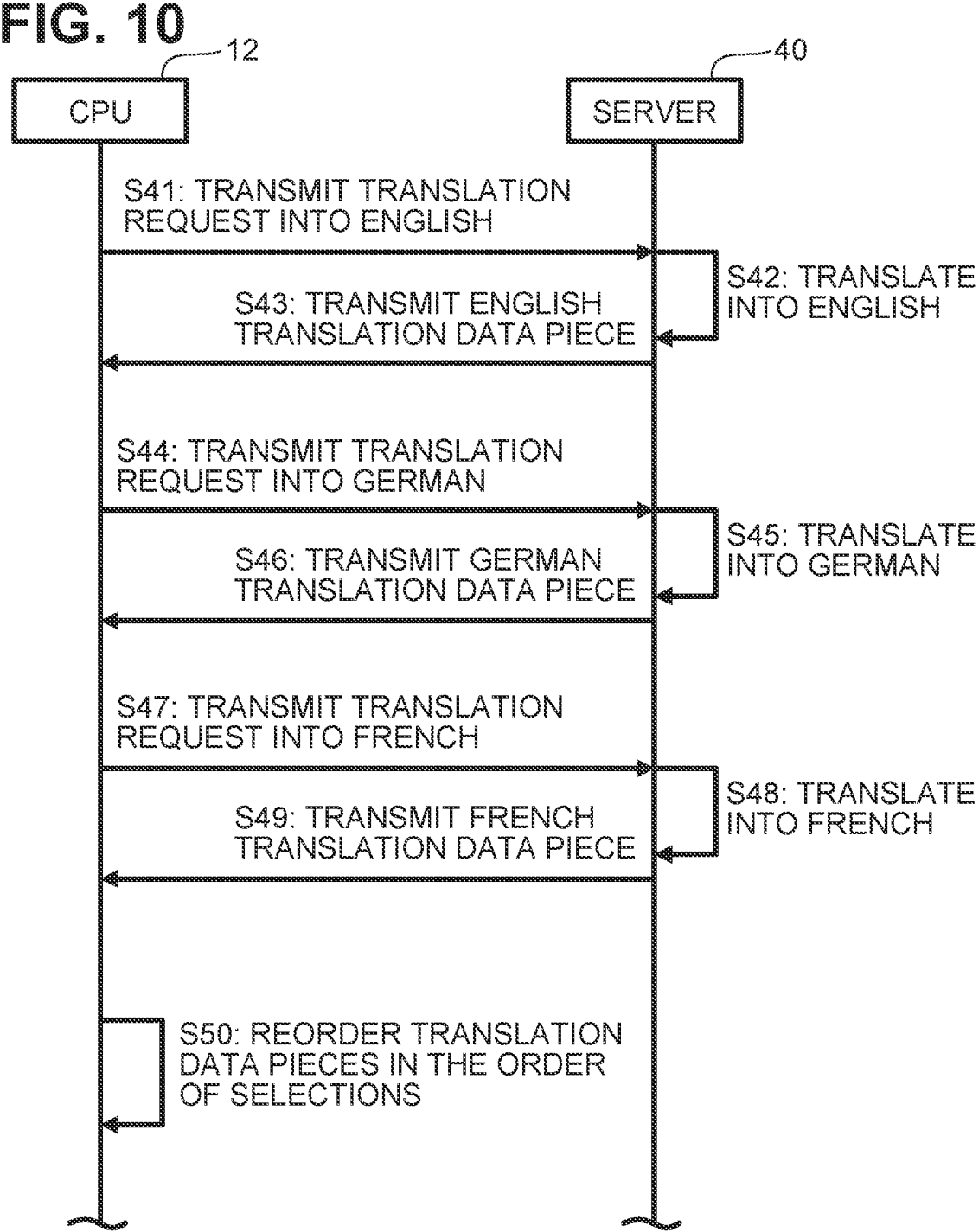
FIG. 10 is a timing chart illustrating a process executed in step S17 in FIG. 6.

Referring back to FIG. 6, in step S17, the CPU 12 performs a translation process to translate the target text string into the second languages received, in step S16, as the target translation languages. FIG. 10 is a sequence diagram illustrating the translation process executed, in step S17, between the CPU 12 and the server 40. FIG. 10 illustrates a case where English, German, and French have been selected, in step S16, as the second languages in this order.

In step S41, the CPU 12 of the information processing apparatus 10 transmits to the server 40 a translation request into English as a second language selected first by the user among those selected in step S16. A translation request is information for requesting the translation AP 45 of the server 40 to perform translating the target text. In this embodiment, the information is described in accordance with the Hypertext Transfer Protocol (HTTP). Specifically, the translation request includes a path designating the location of the server 40 and a reception port number of the server 40, and a body designating the target text string and the second language as a target translation language.

In step S42, upon receiving the translation request transmitted in step S41, the CPU 43 of the server 40 analyzes the received translation request to perform a translation process. In the translation process, the CPU 43 translates the target text string into English, based on the analyzed result, to generate first translation data.

The CPU 43 transmits, in step S43, the first translation data, as a response to the translation request in step S41, to the information processing apparatus 10 (CPU 12). The first translation data represents a translated text string in English. The CPU 12 stores the received first translation data in a buffer area of the memory 16.

In step S44, the CPU 12 transmits to the server 40 a translation request into German as a second language selected second by the user among those selected in step S16.

In step S45, upon receiving the translation request transmitted in step S44, the CPU 43 of the server 40 analyzes the received translation request and translates the target text string into German, based on the analyzed result, to generate second translation data. The CPU 43 transmits, in step S46, the second translation data, as a response to the translation request in step S44, to the information processing apparatus 10 (CPU 12). The second translation data represents a translated text string in German. The CPU 12 stores the received second translation data in the buffer area of the memory 16.

In step S47, the CPU 12 transmits to the server 40 a translation request into French as a second language selected third by the user among those selected in step S16.

In step S48, upon receiving the translation request transmitted in step S47, the CPU 43 of the server 40 analyzes the received translation request and translates the target text string into French, based on the analyzed result, to generate third translation data. The CPU 43 transmits, in step S49, the third translation data, as a response to the translation request in step S47, to the information processing apparatus 10 (CPU 12). The third translation data represents a translated text string in French. The CPU 12 stores the received third translation data in the buffer area of the memory 16.

In step S50, the CPU 12 determines the order of the second language translation data pieces stored in the memory 16 in accordance with the order of selections of second languages by the user. Necessary time for translation by the translation function of the server 40 may vary depending on each second language. Thus, the order of transmissions of translation data pieces from the server 40 to the information processing apparatus 10 may not match the order of transmissions of translation requests from the information processing apparatus 10 to the server 40. Even in such a case, the CPU 12 determines the order of the translation data pieces transmitted from the server 40 in accordance with the order of selections of second languages.

Upon completion of step S50, the CPU 12 proceeds to step S18 in FIG. 6. Referring back to FIG. 6, in step S18, the CPU 12 causes to display in the text area 53 the translated text strings in the respective second languages, using the second language translation data pieces received in step S17. In an example shown in FIG. 4, the target text string in Japanese as the first language which is written in kanji (Chinese characters), and the three text strings "Salt", "Salz", and "Sel" translated from the first language are displayed in the text area 53.

In step S19, the CPU 12 determines whether the finish button 52 has been operated. Upon determining that the finish button 52 has not been operated, the CPU 12 proceeds to step S12. On the other hand, upon determining that the finish button 52 has been operated, the CPU 12 proceeds to step S20 to cause to display in the print area 61 the translated text strings displayed in the text area 53. In response to receiving a print instruction in a state where the translated text strings are displayed in the print area 61, the CPU 12 sends image data representing the translated text strings to a designated printer (i.e., either one of the printers 30 and 31). The designated printer prints an image on a print medium in accordance with the received image data.

Upon completion of step S20, the CPU 12 finishes the current process in FIG. 6. Step S11 is an example of displaying an edit screen and step S13 is an example of displaying a target text string. Step S20 to which the CPU 12 proceeds after determining as "No" in step S14 is an example of displaying the target text string in a first language. Step S20 to which the CPU 12 proceeds after determining as "Yes" in step S14 is an example of displaying a translated text string in a second language. Steps S14 to S17 are an example of a translation process. Step S36 is an example of storing, as history information, information of the number of selections of second languages.

In the above-described first illustrative embodiment, the following advantageous effects are provided. Upon receiving, on the edit screen 50, a finish instruction by operating the finish button 72 without operating the translate button 54 for translating a target text string displayed in the text area 53, the CPU 12 of the information processing apparatus 10 causes to display, in the print area 61, the target text string in the first language displayed in the text area 53. On the other hand, upon receiving, on the edit screen 50, a translation instruction by operating the translate button 54, the CPU 12 transmits to the server 40 a translation request for translating the target text sting displayed in the text area 53 into a second language, and then receives from the server 40 translation data resulted from translating the target text string into the second language. The CPU 12 causes to display, in the print area 61, a translated text string in the second language, using the translation data received from the server 40. This configuration allows a user to complete, on the edit screen 50, an operation for editing a target text string itself, and an operation for translating a target text string and editing the translated text string. This configuration may avoid switching screens for obtaining the translation result such that the information processing apparatus 10 may reduce the user extra work in translating the target text string.

The CPU 12 causes to display, in the text area 53, a translated text string in the second language, based on the translation data transmitted from the server 40. Upon receiving an operation of the finish button 52 on the edit screen 50, the CPU 12 causes to display, in the print area 61, the translated text string in the second language displayed in the text area 53. Because the translated text string in the second language is displayed in the text area 53 on the edit screen 50, the user is allowed to edit the translated text string in the second language, thereby improving usability of the information processing apparatus 10.

The CPU 12 is configured to receive instructions for translating the target text string in the first language displayed in the text area 53 into a plurality of second languages. The CPU 12 transmits to the server 40 a plurality of translation requests, respectively, for translating the target text string into the plurality of second languages. The CPU 12 causes to collectively display, in the print area 61, translated text strings in the plurality of second languages, using translation data pieces received from the server 40. Because the CPU 12 enables to collectively display, in the print area 61, translation results from a single target text string into the plurality of second languages, the user extra work related to translation may further be reduced.

Upon receiving the instructions for translating the target text string into the plurality of second languages, the CPU 12 stores, in the memory 16, the order of receiving the translation instructions. The CPU 12 causes to display, in the text area 53, the translated text strings in the plurality of second languages in the stored order of receiving the translation instructions. This configuration may allow the user to readily recognize the second language of each translation result when the target text string is translated into the plurality of second languages.

The CPU 12 determines the order of the translation data pieces stored in the memory 16 in the stored order of receiving the translation instructions, and causes to display, in the print area 61, the translated text strings in the second languages, based on the determined translation data pieces. The CPU 12 enables to display the translated text strings in the order of receiving the translation instructions from the user, regardless of the order of translation by the translation AP 45 of the server 40. This configuration may also allow the user to readily recognize the second language of each translation result when the target text string is translated into the plurality of second languages.

The CPU 12 causes to display, at upper positions on the edit screen 50, second languages recently selected within a predetermined past time period from the present. More specifically, in step S31 in FIG. 7, the CPU 12 selects second languages whose times of last use stored in the history information Hd fall within the predetermined past time period. Among the selected second languages, the translation language buttons 58 corresponding to second languages whose times of last use are closer to the present are displayed at upper positions in the display order. Thus, the second languages selected recently by the user are displayed on the edit screen 50 at easy-to-see positions in the order reflecting how the user recently used the translation function. This configuration may further reduce the user workload required for translation. Nevertheless, the CPU 12 may cause to display, at upper positions on the edit screen 50, second languages selected more within a predetermined past time period from the present. The user may appropriately set such a predetermined past time period as to allow the CPU 12 to determine the most recent translation process from the present.

Modifications to First Illustrative Embodiment

The CPU 12 may determine the order of the translation language buttons 58 displayed in the translation function column 57, in the order of selections of second languages by a user. In this case, in step S31 in FIG. 7, a translation language button 58 corresponding to a second language selected earlier is displayed at an upper position in the display order.

The CPU 12 may cause to display, at upper positions on the edit screen 50, at least either of the translation language buttons 58 corresponding to second languages selected within the predetermined past time period from the present, and the translation language buttons 58 corresponding to second languages selected more within the predetermined past time from the present. In this modification, the translation function column 57 may include a first display area and a second display area. In the first display area, the CPU 12 may cause to display the translation language buttons 58 corresponding to second languages selected within the predetermined past time at upper positions compared to the translation language buttons 58 corresponding to second languages not selected within the predetermined past time. In the second display area, the CPU 12 may cause to display the translation language buttons 58 corresponding to a certain second language selected more at upper positions compared to translation language buttons 58 corresponding to other second languages than the certain second language. Either of the first display area or the second display area may be omitted.

The CPU 12 may transmit to the server 40 a translation request each time a user operates any of the translation language buttons 58 on the edit screen 50. In this case, each time any translation language button 58 is operated in step S16, the CPU 12 proceeds to step S17 to transmit to the server 40 a translation request into the second language corresponding to the operated translation language button 58. In each of the above-described modifications, the same advantageous effects are provided as in the first illustrative embodiment.

Second Illustrative Embodiment

A printing system 100 according to a second illustrative embodiment will be described, focusing on the structures different from those in the first illustrative embodiment. In the second illustrative embodiment, the same elements as those in the first illustrative embodiment are indicated by the same reference characters, and a description thereof will be omitted.

Figure 11:
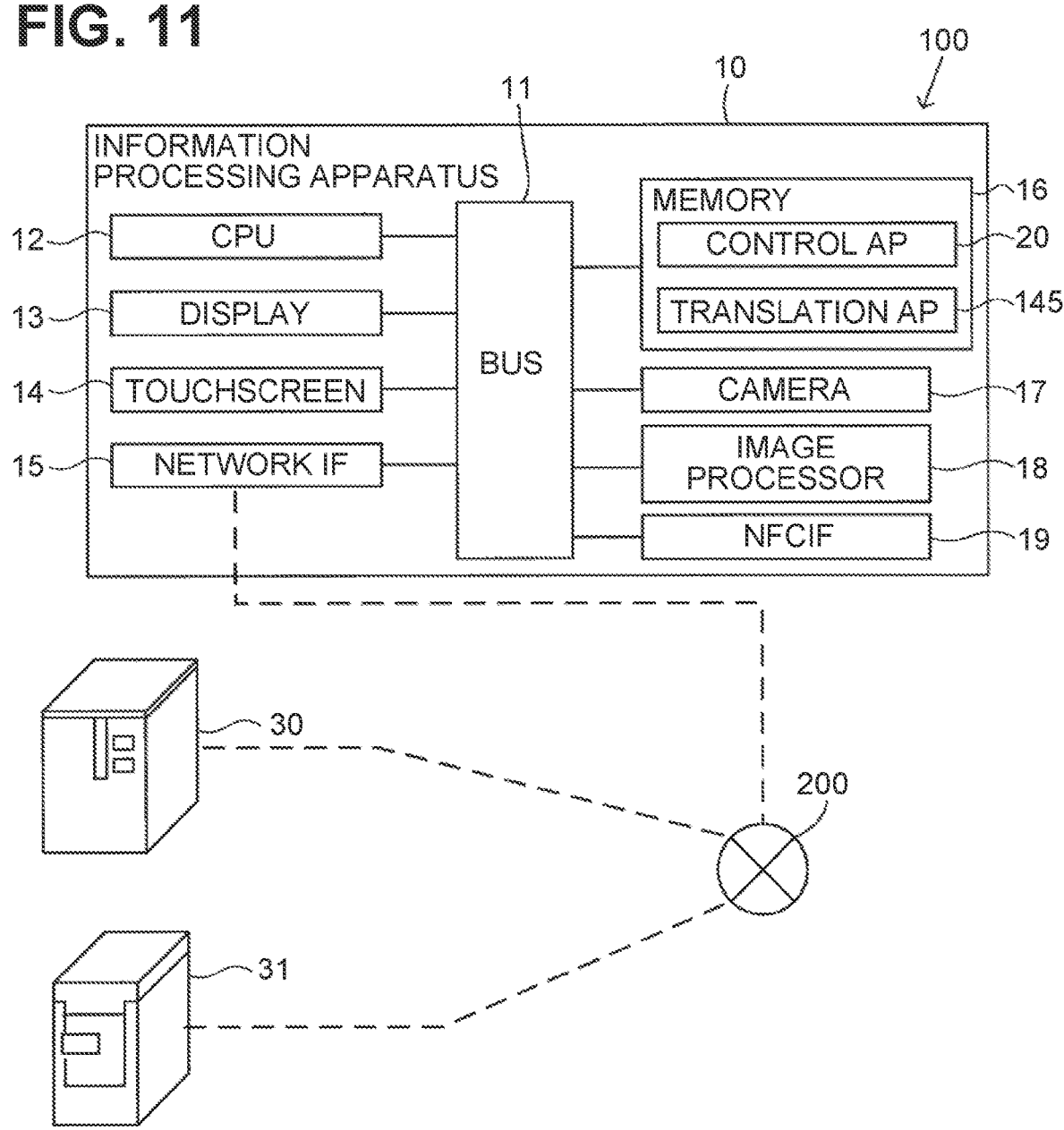
FIG. 11 is a configuration diagram of a printing system.

In this embodiment, as shown in FIG. 11, an information processing apparatus 10 translates a target text string, using a translation application (hereinafter referred to as a translation AP) 145 stored in a memory 16. Namely, in this embodiment, a CPU 12 executes the translation AP 145 to implement translation.

The printing system 100 includes the information processing apparatus 10 and printers 30 and 31. A memory 16 of the information processing apparatus 10 stores therein the translation AP 145 in addition to a control AP 20.

The CPU 12 executes the translation AP 145 to translate a target text string displayed in a text area 53 into a second language. In this case, in step S17 in FIG. 6, the control AP 20 transmits to the translation AP 145 a request for translating the target text string displayed in the text area 53 into the second language. Upon receiving the translation request, the translation AP 145 generates translation data representing a translation in the second language selected in step S16 and transmits the translation data to the control AP 20.

In the above-described second illustrative embodiment, the same advantageous effects are provided as in the first illustrative embodiment.

Other Illustrative Embodiments

Figure 12:
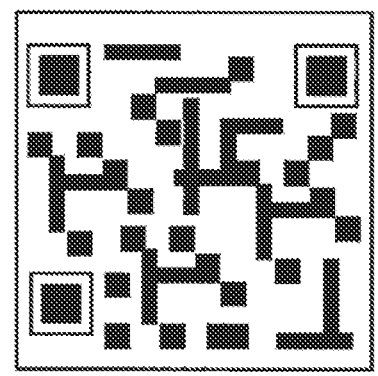
FIG. 12 is a diagram illustrating an example of coded information.

Various modifications may be applied in the above-described embodiments without departing from the spirit and scope of the disclosure. A CPU 12 may cause to display a target text string in a text area 53 on an edit screen 50, by capturing a code such as a QR Code as shown in FIG. 12.

Upon a user's operation for a camera 17 to capture a QR Code, the CPU 12 causes an image processor 18 to analyze the captured image data of the QR Code. In step S12 in FIG. 6, The CPU 12 determines whether a text string has been input, based on the analysis result of the captured image data. For example, upon receiving a URL of a server storing text data, based on the analysis result of the captured image data, the CPU 12 downloads the text data from the server designated by the URL. In step S13, the CPU 12 causes to display in a text area 53 a target text string, using the downloaded text data.

A printer may not be limited to a label printer and may be a printer for printing on print media, such as sheets of paper of A4, B5 and other standard sizes.

An information processing apparatus may implement each process in the above-described embodiments, using a plurality of CPUs. Instead of a CPU, an integrated circuit such as an application specific integrated circuit (ASIC) may be used in a computer.

What is claimed is:
1. A non-transitory computer-readable recording medium storing instructions, wherein the instructions, when executed by a controller of an information processing apparatus, cause the information processing apparatus to perform operations comprising:
　　displaying an edit screen, the edit screen being configured to receive a translation instruction, the edit screen including a text area and a print area, the print area being configured to place therein a target text string to be printed, the text area being configured to display the target text string input into the edit screen;
　　upon receiving on the edit screen an operation for inputting the target text string, displaying the target text string in a first language in the text area;
　　upon receiving a user input on the edit screen a selection to initiate the translation instruction for translating the target text string displayed in the text area from the first language into a second language, translating the target text string to obtain a translation data piece representing a translated text string in the second language;
　　displaying in the text area the translated text string in the second language based on the translation data piece;
　　displaying in the print area the translated text string in the second language, upon receiving an instruction for displaying the translated text string in the print area while the translated text string is displayed in the text area;
　　upon receiving a user input on the edit screen a plurality of selections to initiate translation instructions for translating the target text string displayed in the text area from the first language into a plurality of second languages, translating the target text string to obtain a translation data piece representing a translated text string in each of the plurality of second languages;
　　displaying in the text area the translated text strings in each of the plurality of second languages based on each of the translation data pieces, the translated text strings being displayed in the text area in an order based on the order of the plurality of selections; and
　　displaying in the print area the translated text strings in the each of the plurality of second languages in the order, upon receiving an instruction for displaying the translated text strings in the print area while the translated text strings are displayed in the text area.

2. The non-transitory computer-readable recording medium according to claim 1,
　　wherein the instructions cause the information processing apparatus to perform further operations comprises:
　　upon receiving the plurality of translation instructions for translating the target text string into the plurality of second languages, storing an order of receiving the plurality of translation instructions, and
　　wherein the displaying in the print area comprises displaying in the print area the plurality of translated text strings, in the stored order.

3. The non-transitory computer-readable recording medium according to claim 2,
　　wherein the information processing apparatus includes a memory,
　　wherein the translating the target text string comprises storing the plurality of translation data pieces in the memory, and
　　wherein the displaying in the print area comprises:
　　　　determining the order of the plurality of stored translation data pieces, based on the stored order; and
　　　　displaying in the print area the plurality of translated text strings in the plurality of second languages, in the determined order of the plurality of the translation data pieces.

4. The non-transitory computer-readable recording medium according to claim 1,
　　wherein the translating the target text string comprises storing, as history information, information of the number of selections of the plurality of second languages, and
　　wherein the translating the target text string comprises displaying, at upper positions on the edit screen, at least either of second languages selected within a predetermined past time period from the present, or second languages selected more within the predetermined past time period from the present.

5. The non-transitory computer-readable recording medium according to claim 1, wherein the translating the target text string comprises translating the target text string from the first language into a plurality of second languages upon receiving an operation indicating completion of selection of the plurality of second languages.

6. The non-transitory computer-readable recording medium according to claim 1, wherein the translating the target text string comprises translating the target text string each time the second language is selected on the edit screen.

7. The non-transitory computer-readable recording medium according to claim 1, wherein the instructions cause the information processing apparatus to perform further operations comprises:
　　transmitting a translation request for translating the target text string displayed in the text area into the second language to a server communicable with the information processing apparatus; and
　　receiving the translation data piece from the server,
　　wherein the translating the target text string is implemented by the server.

8. The non-transitory computer-readable recording medium according to claim 7,
　　wherein the instructions cause the information processing apparatus to perform further operations comprising:
　　upon receiving on the edit screen the translation instruction, determining whether communication with the server is available;
　　　　upon determining that the communication with the server is available, transmitting to the server the translation request; and
　　upon determining that the communication with the server is unavailable, notifying on the edit screen that translation of the target text string is unavailable.

9. The non-transitory computer-readable recording medium according to claim 1,
　　wherein the computer-readable recording medium includes a memory, the memory storing a translation application program including the instructions for translating the target text string,
　　wherein the translating the target text string is implemented by the translation application program.

10. The non-transitory computer-readable recording medium according to claim 1,
　　wherein the instructions cause the information processing apparatus to perform further operations comprising determining whether a place instruction for placing the target text string in the print area is received without receiving the translation instruction, or the translation instruction is received,
　　wherein in a case where it is determined that the place instruction is received without receiving the translation instruction, displaying in the print area the target text string in the first language, and wherein in a case where it is determined that the translation instruction is received, translating the target text string from the first language into the second language.

11. The non-transitory computer-readable recording medium according to claim 1, wherein the instructions cause the information processing apparatus to perform further operations comprising:

upon receiving on the edit screen an operation for editing the translated text string, displaying the edited translated text string in the second language in the text area; and displaying in the print area the edited translated text string in the second language, upon receiving an instruction for displaying the edited translated text string in the print area while the edited translated text string is displayed in the text area.

12. An information processing apparatus comprising:
a display;
a user interface; and
a controller comprising hardware configured to:
  display on the display an edit screen, the edit screen including a print area and being configured to receive a translation instruction, the print area being configured to place therein a target text string to be printed, the text area being configured to display the target text string input into the edit screen;
  upon receiving on the edit screen, via the user interface, an operation for inputting the target text string, display in a text area on the edit screen, the target text string in a first language;
  upon receiving a user input on the edit screen a selection to initiate the translation instruction for translating the target text string displayed in the text area from the first language into a second language, translate the target text string to obtain a translation data piece representing a translated text string in the second language;
  display in the text area the translated text string in the second language based on the translation data piece;
  display in the print area the translated text string in the second language, while the translated text string is displayed in the text area, upon receiving an instruction for displaying the translated text string in the print area;
  upon receiving a user input on the edit screen a plurality of selections to initiate translation instructions for translating the target text string displayed in the text area from the first language into a plurality of second languages, translating the target text string to obtain a translation data piece representing a translated text string in each of the plurality of second languages;
  displaying in the text area the translated text strings in each of the plurality of second languages based on each of the translation data pieces, the translated text strings being displayed in the text area in an order based on the order of the plurality of selections; and
  displaying in the print area the translated text strings in the each of the plurality of second languages in the order, upon receiving an instruction for displaying the translated text strings in the print area while the translated text strings are displayed in the text area.

13. A method of controlling an information processing apparatus, comprising:

causing to display an edit screen, the edit screen including a print area and being configured to receive a translation instruction, the print area being configured to place therein a target text string to be printed, the text area being configured to display the target text string input into the edit screen;

upon receiving on the edit screen an operation for inputting the target text string, causing to display in a text area on the edit screen, the target text string in a first language;

upon receiving a user input on the edit screen a selection to initiate the translation instruction for translating the target text string displayed in the text area from the first language into a second language, causing to translate the target text string to obtain a translation data piece representing a translated text string in the second language;

displaying in the text area the translated text string in the second language based on the translation data piece;

causing to display in the print area the translated text string in the second language, while the translated text string is displayed in the text area, upon receiving an instruction for displaying the translated text string in the print area;

upon receiving a user input on the edit screen a plurality of selections to initiate translation instructions for translating the target text string displayed in the text area from the first language into a plurality of second languages, translating the target text string to obtain a translation data piece representing a translated text string in each of the plurality of second languages;

displaying in the text area the translated text strings in each of the plurality of second languages based on each of the translation data pieces, the translated text strings being displayed in the text area in an order based on the order of the plurality of selections; and displaying in the print area the translated text strings in the each of the plurality of second languages in the order, upon receiving an instruction for displaying the translated text strings in the print area while the translated text strings are displayed in the text area.

* * * * *